United States Patent
Schaller et al.

(10) Patent No.: US 7,162,866 B2
(45) Date of Patent: Jan. 16, 2007

(54) METHOD FOR OPERATING AN INTERNAL COMBUSTION ENGINE, ESPECIALLY A MOTOR VEHICLE INTERNAL COMBUSTION ENGINE

(75) Inventors: Johannes Schaller, Leonberg (DE); Georg Weber, Bradcenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/477,439

(22) PCT Filed: Apr. 30, 2002

(86) PCT No.: PCT/DE02/01565

§ 371 (c)(1),
(2), (4) Date: May 26, 2004

(87) PCT Pub. No.: WO02/090732

PCT Pub. Date: Nov. 14, 2002

(65) Prior Publication Data

US 2004/0194449 A1 Oct. 7, 2004

(30) Foreign Application Priority Data

May 10, 2001 (DE) ................ 101 22 636

(51) Int. Cl.
*F01N 3/00* (2006.01)
(52) U.S. Cl. ............... 60/295; 60/274; 60/286; 60/287; 60/301
(58) Field of Classification Search .......... 60/274, 60/286, 287, 288, 295, 301, 303
See application file for complete search history.

(56) References Cited

U.S. PATENT DOCUMENTS

| | | | | |
|---|---|---|---|---|
| 4,720,972 A | * | 1/1988 | Rao et al. | 60/274 |
| 4,813,233 A | * | 3/1989 | Vergeer et al. | 60/286 |
| 5,085,049 A | * | 2/1992 | Rim et al. | 60/274 |
| 5,365,734 A | * | 11/1994 | Takeshima | 60/288 |
| 5,406,790 A | | 4/1995 | Murakami et al. | |
| 5,974,791 A | * | 11/1999 | Hirota et al. | 60/276 |
| 6,105,365 A | * | 8/2000 | Deeba et al. | 60/274 |

FOREIGN PATENT DOCUMENTS

| | | |
|---|---|---|
| DE | 692 21 287 | 2/1998 |
| DE | 100 01 134 | 12/2000 |
| DE | 199 28 974 | 12/2000 |
| DE | 100 30 064 | 4/2001 |
| EP | 0 862 941 | 9/1998 |
| EP | 1 223 312 | 7/2002 |

* cited by examiner

*Primary Examiner*—Thomas Denion
*Assistant Examiner*—Diem Tran
(74) *Attorney, Agent, or Firm*—Kenyon & Kenyon LLP

(57) ABSTRACT

An internal combustion engine of a motor vehicle has an adsorption catalyst which may be loaded with nitrogen oxides and unloaded. During the unloading, the exhaust-gas stream through the adsorption catalyst may be decreased by a control unit or an add-on device, using a valve. During the unloading, a fuel/air mixture may be added to the exhaust-gas stream reaching the adsorption catalyst, by the control unit or the add-on device, using an atomizer. Upon switching over from the unloading to the loading of the adsorption catalyst, the addition of the fuel/air mixture to the exhaust-gas stream is initially stopped by the control unit or the add-on device. The decreasing of the exhaust-gas stream is then ended after a predefined flushing time.

7 Claims, 2 Drawing Sheets

METHOD FOR OPERATING AN INTERNAL COMBUSTION ENGINE, ESPECIALLY A MOTOR VEHICLE INTERNAL COMBUSTION ENGINE

FIELD OF THE INVENTION

The present invention relates to a method for operating an internal combustion engine of, e.g., a motor vehicle. The present invention also relates to an internal combustion engine for, e.g., a motor vehicle, as well as a control unit or an add-on device for such an internal combustion engine.

BACKGROUND INFORMATION

Internal combustion engines, e.g., diesel engines, in which an oxidation catalyst and an adsorption catalyst are present for purifying the produced exhaust gas are known. In the case of gasoline engines, in particular direct-injection internal combustion engines, it is known that an adsorption catalyst can be used for purifying the exhaust gas. Such adsorption catalysts are operated in two operating phases. During a loading phase, the adsorption catalyst is loaded with nitrogen oxides, which are temporarily stored in the adsorption catalyst. During a regeneration phase, the nitrogen oxides are removed again from the adsorption catalyst, and the adsorption catalyst is regenerated in this manner. To regenerate the adsorption catalyst, i.e., during the unloading phase, an "enriched" exhaust-gas stream, i.e., an exhaust-gas stream loaded with fuel, is supplied to the adsorption catalyst. During the loading phase, the internal combustion engine may be operated with a lean mixture, i.e., at a lambda greater than 1. As mentioned, the nitrogen oxides produced in this case are temporarily stored in the adsorption catalyst and consequently do not reach the environment as pollutants. During the regeneration of the adsorption catalyst, the temporarily stored nitrogen oxides are converted into harmless substances and released into the open air.

In particular, in the case of diesel engines, it is known that a bifurcation element can be installed in the exhaust pipe, in order to accommodate a valve at this position. The volume of the exhaust-gas stream to the adsorption catalyst may be changed with the aid of the valve. In particular, the exhaust-gas stream to the adsorption catalyst may be decreased during the unloading phase, in order to prevent, in this manner, the adsorption catalyst from being acted upon too intensely by exhaust gases, and to simplify the enrichment of the exhaust-gas stream.

In diesel engines, it is also particularly well-known that, during the unloading phase, a fuel/air mixture can be added to the exhaust-gas stream supplied to the adsorption catalyst, in order to attain, in this manner, the already mentioned, enriched, and therefore fuel-loaded (lambda less than 1) exhaust-gas stream.

It has been shown that the above-described operating method, in particular the switching-over between the loading phase and the unloading phase of the adsorption catalyst, is not sufficient for preventing a release of pollutants to the environment to as large an extent as possible.

The object of the present invention is to provide a method for operating an internal combustion engine, which method minimizes pollutants released into the environment.

SUMMARY

According to the present invention, upon switching over from the unloading phase to the loading phase, the addition of the fuel/air mixture to the exhaust-gas stream is not ended at the same time as the decreasing of the exhaust-gas stream, but rather the decreasing of the exhaust-gas stream only takes place after a certain period of time, namely after a predefined flushing time. Therefore, according to the present invention, no more fuel/air mixture is initially added to the exhaust-gas stream, in order to subsequently stop the decreasing of the exhaust-gas stream after the expiration of the predefined flushing time. In other words, this means that the valve accommodated in the exhaust pipe of the internal combustion engine is only switched over into the state provided for the loading phase of the adsorption catalyst, after the expiration of the flushing time.

This delayed switching-over of the valve in the exhaust pipe allows the fuel/air mixture, which was finally added to the exhaust-gas stream during the unloading phase, to still reach the adsorption catalyst with the decreased exhaust-gas stream. This decreased exhaust-gas stream ensures that the fuel/air mixture can contribute to the regeneration of the adsorption catalyst in the desired manner. Therefore, no non-purified hydrocarbons travel through the adsorption catalyst into the open air. This means that fewer pollutants are released into the environment.

The method according to the present invention may be implemented in the form of a computer program, which is provided for a control unit or an add-on device. The computer program may run, in particular, on a microprocessor of the control unit or the add-on device, and may then implement the method of the present invention. In this context, the computer program may be stored on an electrical storage medium, e.g., in a flash memory.

DETAILED DESCRIPTION

Figure 1:
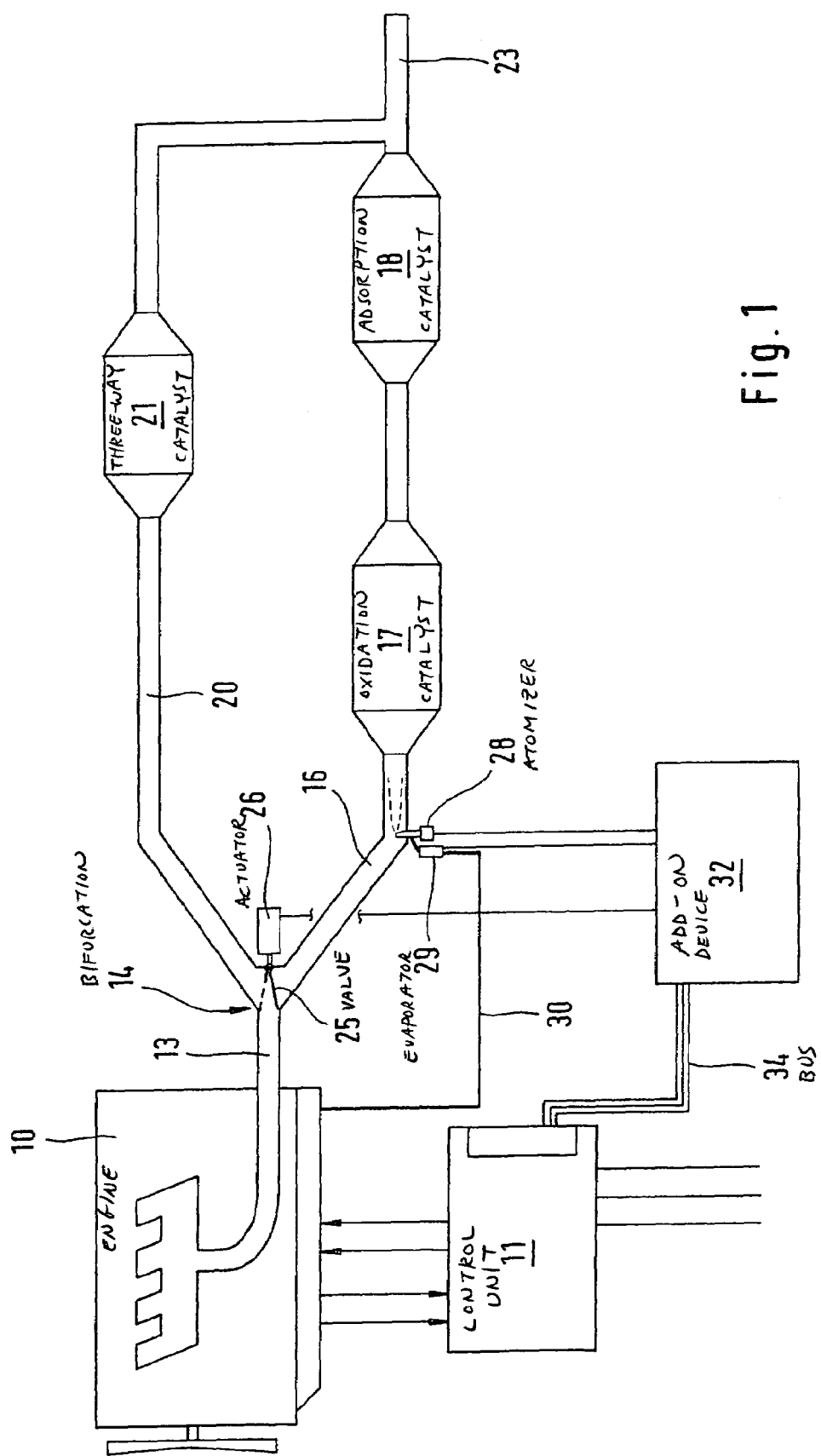
FIG. 1 shows a schematic block diagram of an exemplary embodiment of an internal combustion engine according to the present invention.

Represented in FIG. 1 is an internal combustion engine 10, which may be a diesel engine. Internal combustion engine 10 is coupled to a control unit 11 via input and output signals. Control unit 11 is provided with a microprocessor or the like, on which a computer program is stored that is capable of implementing the necessary methods for controlling and/or regulating the performance quantities of internal combustion engine 10.

Internal combustion engine 10 is provided with an exhaust pipe 13, to which the exhaust gases produced during the combustion of the fuel are fed. A bifurcation 14, to which two or more exhaust-gas branches are connected, is connected to exhaust pipe 13.

In a first branch 16, exhaust pipe 13 is connected in series to an oxidation catalyst 17 and an adsorption catalyst 18. Adsorption catalyst 18 is, in particular, a so-called $NO_x$ adsorption catalyst. In a second branch 20, exhaust pipe 13 is connected to a three-way catalyst 21. As an alternative, it is possible to provide an oxidation catalyst and a post-connected adsorption catalyst in second branch 20 in place of three-way catalyst 21. In this alternative, the two branches 16 and 20 are formed in the same manner.

After adsorption catalyst 18 and three-way catalyst 21, the two branches 16 und 20 are reunited to form a common exhaust pipe 23.

Exhaust pipe 13 is provided with a valve 25 in the region of bifurcation 14. Valve 25 may be switched back and forth between two end positions. In the first end position, the entire exhaust-gas stream is directed into first branch 16, while in the second end position of valve 25, the entire exhaust-gas stream is directed into second branch 20. The latter-mentioned, second end position is represented in FIG. 1.

Valve 25 may also be adjusted to any intermediate position between the two described end positions. In these cases, the exhaust gas is proportionally distributed to the two branches 16, 20. In this context, the proportions of the two formed gas streams are a function of the position of valve 25.

Valve 25 is assigned an actuator 26, by which valve 25 may be set to the two end positions, as well as to any intermediate position. Actuator 26 may be, for example, an electrical servomotor, a pneumatic actuator, or the like, which is coupled to valve 25 in a force-locked manner.

In first branch 16, an atomizer 28 is provided downstream from bifurcation 14 and upstream from oxidation catalyst 17. An injection nozzle or the like may also be present in place of atomizer 28. With the aid of atomizer 28, it is possible to introduce fuel or a fuel/air mixture into first branch 16, and indeed in such a manner, that it is present in first branch 16 in the form of a fuel-loaded gas or fuel vapor.

In the present exemplary embodiment, atomizer 28 is assigned an evaporator 29, which may be a heating element or another heating device. Fuel from internal combustion engine 10 is supplied to evaporator 29 and atomizer 28 by a line 30. This fuel is then heated by evaporator 29, so that a fuel/air mixture is formed. As explained, this fuel-loaded gas is then fed to first branch 16 with the aid of atomizer 28.

Due to the exhaust gas flowing through first branch 16, the fuel vapor fed to first branch 16 by atomizer 28 first arrives at oxidation catalyst 17 and subsequently travels to adsorption catalyst 18.

Actuator 26, atomizer 28, and evaporator 29 are coupled to an add-on device 32, which is a control unit that can control and/or regulate actuator 26, evaporator 28, and atomizer 29. In particular, valve 25 may be adjusted by add-on device 32, using actuator 26. Evaporator 28 may be opened by add-on device 32, as well, so that the supply of fuel-loaded gas to oxidation catalyst 17 and adsorption catalyst 18 may be switched on and off.

Add-on device 32 is coupled to control unit 11 by a bus system 34. This allows add-on device 32 to receive the performance quantities of internal combustion engine 10 necessary for the control of actuator 26, atomizer 28, and evaporator 29, from control unit 11, via this bus system 34. In this manner, it is likewise possible for add-on device 32 to transmit information to control unit 11 via bus system 34.

During the operation of internal combustion engine 10, two operating phases exist, namely a loading phase and an unloading phase.

In the loading phase, valve 25 is switched into the first end position, so that all of the exhaust gas of internal combustion engine 10 is directed into first branch 16 and, consequently, to oxidation catalyst 17 and adsorption catalyst 18. The NO contained in the exhaust gas is converted to $NO_2$ in oxidation catalyst 17. This $NO_2$ is then stored in downstream adsorption catalyst 18 amid the formation of $NO_3$. This represents the loading of adsorption catalyst 18.

Since adsorption catalyst 18 has only a limited loading capacity for the supplied nitrogen oxides, a switch-over must take place from the loading phase into the unloading phase after a predefined period of time.

In the unloading phase, valve 25 is adjusted to an intermediate position between the two end positions. This results in exhaust gas of internal combustion engine 10 flowing into the two branches 16, 20. For example, valve 25 may be adjusted so that 10% of the exhaust gas travels into first branch 16, while the remaining 90% of the exhaust gas is directed into second branch 20.

In the unloading phase, a fuel/air mixture is added to the exhaust-gas stream in first branch 16, via atomizer 28 and evaporator 29. As already explained, this results in a fuel-loaded gas reaching adsorption catalyst 18. This gas acts as a reducing agent in adsorption catalyst 18 and consequently results in adsorption catalyst 18 being regenerated or unloaded.

This unloading phase is implemented for an additional, predefined period of time. At the end of the unloading phase, a switch-over is made again to the loading phase.

The ratio of the unloading phase to the loading phase may be selected, for example, so that a switch-over is made from one phase to the other every 20 seconds. This ratio may also be adjusted differently as a function of performance quantities of internal combustion engine 10.

Figure 2A:
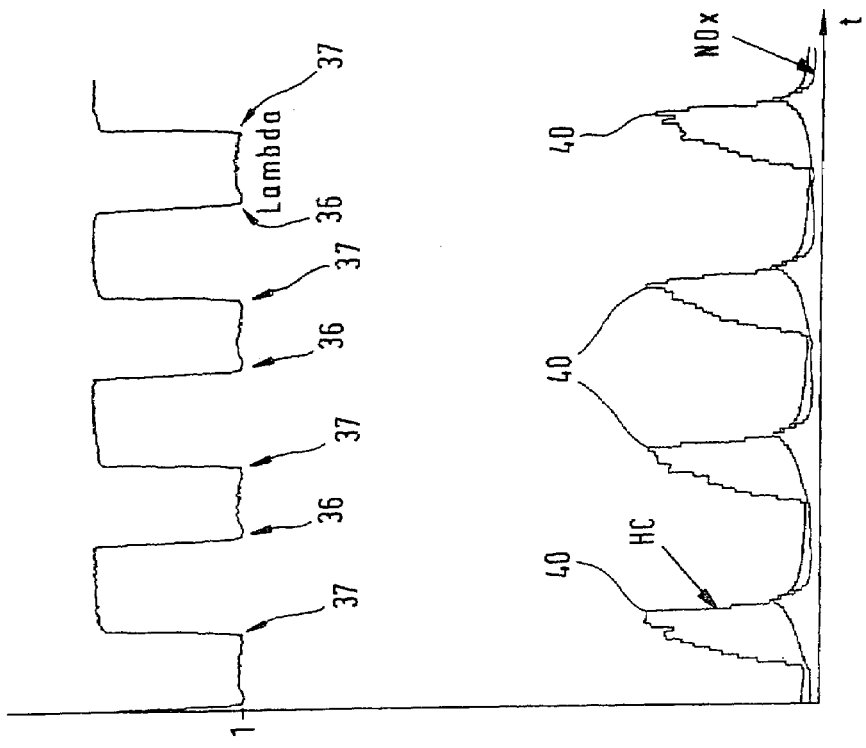
FIGS. 2a and 2b show schematic diagrams of performance quantities of the internal combustion engine of FIG. 1 in a method according to the related art, and in a method according to an exemplary embodiment of the present invention, respectively.
Figure 2B:
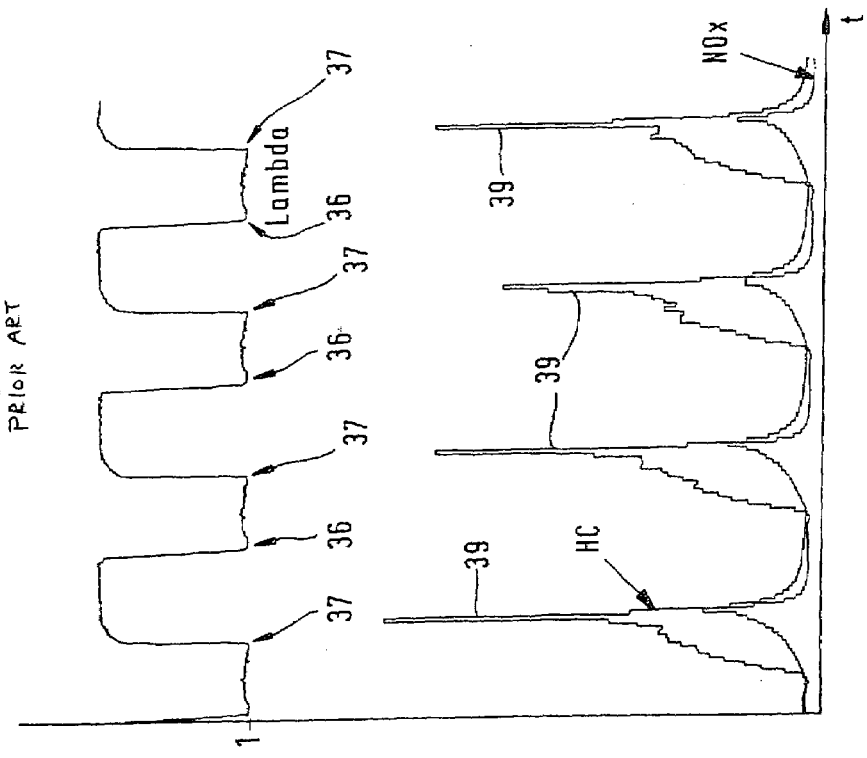

The operation of internal combustion engine 10 is plotted versus time t in each of FIGS. 2a and 2b. The time, at which a switch-over is made from the loading phase into the unloading phase, is indicated by reference numeral 36 in each of FIGS. 2a and 2b. At this time 36, the lambda of the exhaust gas jumps from a value greater than 1 to lambda equal to 1.

At time 36, valve 25 and atomizer 28 are simultaneously triggered by add-on device 32. This means that, at time 36, at which a switch-over is made from the loading phase to the unloading phase, valve 25 is switched, on one hand, to an intermediate position between the two end positions, so that the exhaust gas of internal combustion engine 10 is supplied to the two branches 16, 20, and on the other hand, a fuel/air mixture is simultaneously fed by atomizer 28 into first branch 16 and, consequently, to adsorption catalyst 18. This simultaneous switch-over of valve 25 and atomizer 28 to the unloading phase allows adsorption catalyst 18 to be regenerated and, therefore, unloaded as of this time 36.

The time at which a switch-over is made again from the unloading phase to the loading phase is indicated in FIGS. 2a and 2b by reference numeral 37. At this time 37, the lambda of the exhaust gas jumps from lambda=1 to a value greater than 1.

In FIG. 2a, representing the operation of prior art method, valve 25 and atomizer 28 are simultaneously triggered by add-on device 32 at time 37. This means that, at time 37, valve 25 is switched over, on one hand, to its first end position, in which all of the exhaust gas of internal combustion engine 10 is supplied to first branch 16 and, consequently, to adsorption catalyst 18; and that, on the other hand, atomizer 28 is switched off and, consequently, no more fuel/air mixture is fed to first branch 16. This simultaneous switch-over of valve 25 and atomizer 28 from the unloading phase to the loading phase at time 37 results in a composition of the exhaust gas in exhaust pipe 23 according to FIG. 2a.

As represented in FIG. 2a, the curve of hydrocarbons HC and nitrogen oxides $NO_x$ in exhaust pipe 23 is a function of the switch-overs between the unloading phase and the loading phase. In particular, at times 37 at which a switch-over is made from the unloading phase to the loading phase, a particularly high concentration of hydrocarbons HC is present in the exhaust gas of exhaust pipe 23. These hydrocarbon spikes HC are indicated in FIG. 2a by reference numeral 39.

As can be gathered from FIG. 2b, representing the method according to the present invention, hydrocarbon spikes HC are, in comparison with FIG. 2a, no longer present or at least substantially smaller. In FIG. 2b, these remaining spikes are indicated by reference numeral 40.

In contrast to FIG. 2a, in FIG. 2b, valve 25 and atomizer 28 are not switched over from the unloading phase to the loading phase at time 37. Instead, the following procedure is implemented by add-on device 32:

At time 37, the supply of the fuel/air mixture via atomizer 28 is initially stopped. This means that atomizer 28 is switched off at time 37. However, valve 25 is not yet changed at this time 37. After time 37, valve 25 is only switched over after the expiration of a predefined flushing time, which may be in the range of approximately 0.5 seconds to approximately 3 seconds. This means that, after time 37, valve 25 is only switched into its first end position after the expiration of this flushing time, so that, therefore, all of the exhaust gas is only directed into first branch 16 and, consequently, to adsorption catalyst 18 after the expiration of this flushing time. During the mentioned flushing time, valve 25 remains in its intermediate position, which was set for the unloading phase.

This sequential switching-over of atomizer 28 and valve 25 from the unloading phase to the loading phase allows the fuel/air mixture supplied by atomizer 28 during the unloading phase to be transported by a "small" exhaust-gas stream to adsorption catalyst 18 during the flushing time, during which valve 25 is not yet switched over, so that this adsorption catalyst 18 is only regenerated by this "small", fuel-loaded exhaust-gas stream. Therefore, the fuel/air mixture still present in first branch 16 is prevented from being directed by the entire exhaust-gas stream to adsorption catalyst 18 at time 37, due to a switch-over of valve 25, and adsorption catalyst 18 is therefore prevented from being acted upon by the entire, fuel-loaded exhaust-gas stream.

The successive switching-over of atomizer 28 and valve 25 to the loading phase allows adsorption catalyst 18 to be regenerated by a "small" exhaust-gas stream, as long as it carries fuel vapor with it. Approximately after expiration of the flushing time, valve 25 is only switched over when the remaining fuel vapor still supplied during the unloading phase has reached the adsorption catalyst and regenerated it. In this manner, spikes 39 of hydrocarbon HC of FIG. 2a do not occur in FIG. 2b, or at least substantially minimized.

Due to the "small" exhaust-gas stream, adsorption catalyst 18 is therefore able to use the supplied fuel vapor for regeneration in FIG. 2b, so that no hydrocarbon HC, or at least nearly no hydrocarbon HC, reaches exhaust pipe 23. Because the entire exhaust-gas stream is supplied in FIG. 2a as of time 37, adsorption catalyst 18 is, in this case, not able to use all of the fuel vapor for regeneration, so that, to a large extent, hydrocarbons HC escape into exhaust pipe 23 and represented in the form of spikes 39 in FIG. 2a.

In FIG. 1, one differentiates between control unit 11 and add-on device 32. This should make clear that add-on device 32, together with valve 25, actuator 26, atomizer 28, evaporator 29, and line 30, may also be subsequently built into an internal combustion engine. In this case, the coupling of add-on device 32 is accomplished, as described, via bus system 34. However, it is alternatively possible for all the functions of add-on device 32 to be integrated into control unit 11, as well. In this case, no separate add-on device 32 and also no bus system 34 are present. Therefore, the first possibility represents a retrofitted product, while, in the second option, all of the functions are already included in the initial product.

What is claimed is:

1. A method for operating an internal combustion engine of a motor vehicle, the engine being operatively connected to an adsorption catalyst for treating an exhaust-gas stream, comprising:

loading the adsorption catalyst with nitrogen oxides in the exhaust-gas stream;

unloading the adsorption catalyst, wherein the exhaust-gas stream through the adsorption catalyst is decreased during the unloading, and wherein a fuel/air mixture is added to the exhaust-gas stream upstream from the adsorption catalyst during the unloading; and switching over from the unloading to the loading of the adsorption catalyst, wherein the addition of the fuel/air mixture to the exhaust-gas stream is initially ended at the beginning of the switching over, wherein the decreasing of the exhaust-gas stream is ended following a predefined flushing time after the ending of the addition of the fuel/air mixture, and wherein the flushing time is predefined such that the unloading of the adsorption catalyst by the decreased exhaust-gas stream continues during the flushing time as long as the exhaust-gas stream continues to carry the fuel/air mixture.

2. The method as recited in claim 1, wherein the flushing time is in a range of approximately 0.5 second to approximately 3 seconds.

3. The method as recited in claim 2, wherein the internal combustion engine is a diesel engine.

4. A computer program for execution in a computing element associated with one of a control unit and an add-on device for an internal combustion engine, the engine being operatively connected to an adsorption catalyst for treating an exhaust-gas stream, the computer program performing, when executed in the computing element, control of the following steps:

loading the adsorption catalyst with nitrogen oxides in the exhaust-gas stream;

unloading the adsorption catalyst, wherein the exhaust-gas stream through the adsorption catalyst is decreased during the unloading, and wherein a fuel/air mixture is added to the exhaust-gas stream upstream from the adsorption catalyst during the unloading; and switching over from the unloading to the loading of the adsorption catalyst, wherein the addition of the fuel/air mixture to the exhaust-gas stream is initially ended at the beginning of the switching over, wherein the decreasing of the exhaust-gas stream is ended following a predefined flushing time after the ending of the addition of the fuel/air mixture, and wherein the flushing time is predefined such that the unloading of the adsorption catalyst by the decreased exhaust-gas stream continues during the flushing time as long as the exhaust-gas stream continues to carry the fuel/air mixture.

5. The computer program as recited in claim 4, wherein the computer program is stored on flash memory medium.

6. One of a control unit and an add-on device for an internal combustion engine of a motor vehicle, the engine being operatively connected to an adsorption catalyst for treating an exhaust-gas stream, comprising:

means for controlling loading of the adsorption catalyst with nitrogen oxides in the exhaust-gas stream;

means for controlling unloading of the adsorption catalyst, wherein the exhaust-gas stream through the adsorption catalyst is decreased during the unloading by actuation of a valve, and wherein a fuel/air mixture is added to the exhaust-gas stream by actuation of an atomizer upstream from the adsorption catalyst during the unloading; and means for controlling switching over from the unloading to the loading of the adsorption catalyst, wherein the addition of the fuel/air mixture to the exhaust-gas stream is initially ended at the beginning of the switching over, wherein the decreasing of the exhaust-gas stream is ended following a predefined flushing time after the ending of the addition of the fuel/air mixture, and wherein the flushing time is predefined such that the unloading of the adsorption catalyst by the decreased exhaust-gas stream continues during the flushing time as long as the exhaust-gas stream continues to carry the fuel/air mixture.

7. A system for treating an exhaust-gas stream generated by an internal combustion engine of a motor vehicle, comprising:

an adsorption catalyst operatively connected to the internal combustion engine, wherein the adsorption catalyst is adapted to be loaded with nitrogen oxides in the exhaust-gas stream and unloaded;

a valve arrangement for decreasing the exhaust-gas stream reaching the adsorption catalyst during the unloading; and an atomizer for injecting, during the unloading, a fuel/air mixture to the exhaust-gas stream upstream from the adsorption catalyst;

wherein, in switching over from the unloading to the loading of the adsorption catalyst, the addition of the fuel/air mixture to the exhaust-gas stream is initially ended at the beginning of the switching over, wherein the decreasing of the exhaust-gas stream is ended following a predefined flushing time after the ending of the addition of the fuel/air mixture, and wherein the flushing time is predefined such that the unloading of the adsorption catalyst by the decreased exhaust-gas stream continues during the flushing time as long as the exhaust-gas stream continues to carry the fuel/air mixture.

* * * * *